United States Patent [19]

Rosin et al.

[11] 4,019,789
[45] Apr. 26, 1977

[54] TROLLEY WHEEL

[75] Inventors: Walter M. Rosin, Grand Rapids; Douglas J. VanDerMeulen, Shelbyville; Charles C. Frost, Grand Rapids, all of Mich.

[73] Assignee: C. L. Frost & Son, Inc., Grand Rapids, Mich.

[22] Filed: May 10, 1976

[21] Appl. No.: 684,627

[52] U.S. Cl. .......................... 308/190; 301/63 PW; 308/208
[51] Int. Cl.² ...................................... F16C 33/00
[58] Field of Search ............ 308/16, 20, 190, 191, 308/208, 209, 3.8; 301/5.7, 63 PW, 63 R; 193/37; 16/107

[56] References Cited
UNITED STATES PATENTS

| | | | |
|---|---|---|---|
| 3,103,387 | 9/1963 | Saxenberg | 301/5.7 |
| 3,360,314 | 12/1967 | Di Loreto | 308/191 |
| 3,469,892 | 9/1969 | Langstroth | 308/3.8 |

Primary Examiner—Joseph F. Peters, Jr.
Assistant Examiner—Gene A. Church
Attorney, Agent, or Firm—Price, Heneveld, Huizenga & Cooper

[57] ABSTRACT

The specification discloses a trolley wheel assembly useful in conveyor applications especially in the food processing industry. The assembly includes a plastic wheel, metallic outer and inner races positioned with respect to the wheel and antifriction means such as ball bearings between the races. The outer races include noncircular, circumferential surfaces, preferably flat or rectilinear edges on radial flanges of the annular, contoured rings forming the outer races, engaging corresponding noncircular surfaces on the wheel to prevent rotation between the wheel and outer races. The outer races are also axially retained by either a circumferential or stud portion of the plastic wheel formed over and against the outer surface of said outer races.

16 Claims, 8 Drawing Figures

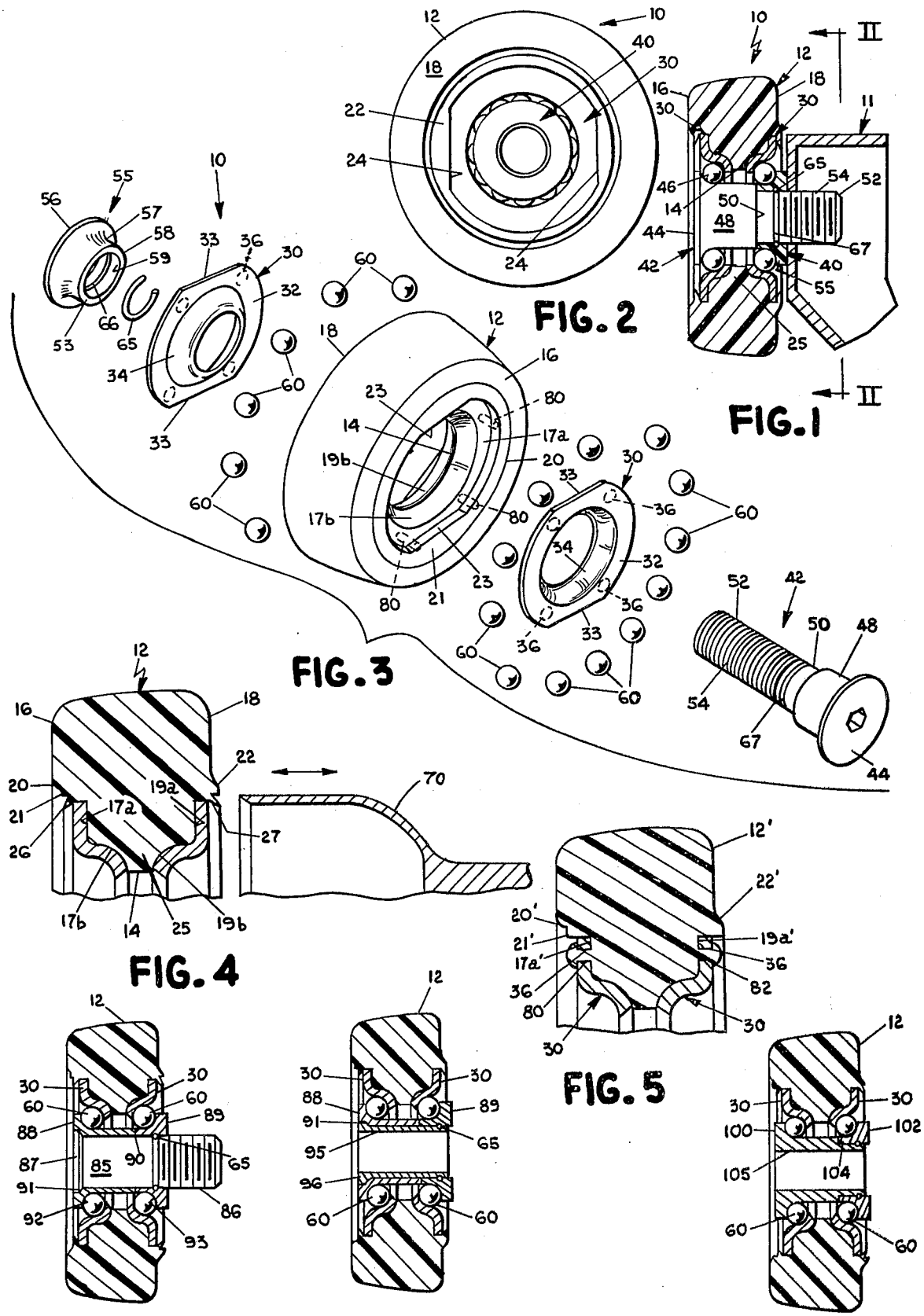

TROLLEY WHEEL

BACKGROUND OF THE INVENTION

This invention relates to bearing structures and, more particularly, to a combination plastic-metallic trolley wheel assembly incorporating a race structure which increases the life, durability, and reduces wear of the structure.

Conventional trolley wheels used in typical overhead conveyor systems in manufacturing and fabrication plants have long utilized metallic wheels with bearings supported intermediate the wheel and an inner race. Such wheels have deteriorated undesirably in many applications, especially in the food processing industry where trolley wheels on conveyors are subjected to high heat and moisture conditions, are frequently washed to maintain cleanliness, and must also bear relatively high loads.

Recently, a sanitary trolley wheel has been designed as disclosed in copending, commonly assigned United States patent application Ser. No. 528,794 entitled SANITARY ANTIFRICTION TROLLEY WHEEL, filed Dec. 2, 1974, invented by Frederick R. Sytsma. This sanitary trolley wheel assembly includes at least one metallic, annular outer race ring supported on a plastic tire or wheel and spaced from an inner race with bearings supported between the races. This assembly has been revolutionary in solving many of the problems previously encountered in the food processing industry in connection with overhead conveyors since it can bear high loads, is substantially noiseless in operation, does not flake or chip causing particles of the wheel assembly to drop onto the food being processed, and can be assembly to drop onto the food being processed, and can be subjected to high heat and moisture conditions such as steam cleaning without corrosion or other deterioration. In certain applications of the wheel assembly, it has been found that the metallic outer race ring has rotated with respect to the wheel or tire during use causing wear and eventual sloppiness in the assembly. This also causes friction which produces heat buildup which also tends to shorten the life of the assembly.

An associated problem encountered in the above trolley wheel assembly as well as other bearing assemblies utilizing races of materials dissimilar from the associated tire or wheel has been the inability to efficiently and effectively retain the dissimilar races to the wheel over the life of the assembly. In one attempt, tangs or flanges on the race rings were impressed into the dissimilar material of the wheel. Such rings would eventually separate from the wheel. Further, it has been found that if the wheel material is plastic, especially the type which can bear heavy loads, the plastic tends to expel the rings and the tangs or flanges therefrom.

Accordingly, there has been a need for a trolley wheel assembly which is durable, long wearing, can be subjected to high heat and moisture conditions such as in sanitary food processing applications, which retains the benefit of a plastic tire or wheel, and yet can bear heavy loads. Especially in plastic tire and metallic outer race ring combinations, there has been a need for an assembly which avoids rotation between the race rings and the wheels and prevents separation therebetween.

SUMMARY OF THE INVENTION

Accordingly, the present invention provides an improved trolley wheel assembly useful in conveyor applications and especially in sanitary applications such as in the food processing industry where the assemblies must be subjected to high heat and moisture conditions such as steam cleaning at regular intervals. Essentially, the assembly includes a plastic tire or trolley wheel having a central opening and at least one annular outer metallic bearing race positioned on the wheel adjacent the opening. Axial means extend through the opening including an annular metallic inner bearing race extending about at least a portion of the axial means and spaced from the outer race. A plurality of antifriction means, such as ball bearings, are disposed in the space between the races for rotatably supporting the wheel and the outer bearing race with respect to the inner race. The outer race includes an annular, contoured portion matched to the contour of the antifriction means as well as a noncircular, circumferential surface engaging a corresponding noncircular surface forming a portion of the wheel. The two surfaces are generally parallel to one and in engagement with another whereby rotation between the wheel and outer bearing race is prevented. In one embodiment, the noncircular circumferential surface is a rectilinear or flat edge included on a flange extending radially outwardly from the contoured portion of the outer race.

In another aspect of the invention, a portion of the plastic wheel which is integral and in one piece with the wheel is formed over the outer surface of the outer bearing race whereby the outer race is retained between portions of the wheel and prevented from moving axially. In specific embodiments, the formed portion may comprise an annular shoulder which is staked over the ring about the circumference of the ring or one or more studs projecting through the ring and staked against its outer surface.

The present invention provides a durable trolley wheel assembly wherein wear and heat buildup typically encountered during use of prior known assemblies are reduced to a minimum and/or prevented. The life of the assembly is substantially increased over known structures. The assembly resists corrosion and deterioration and has a high load bearing capability because of the use of metallic races even though the tire or wheel itself is plastic and therefore substantially noiseless. The assembly may be used with various axle arrangements including multipiece inner race structures and is easily assembled. The completed assembly includes outer race rings which are restrained from rotation with respect to the wheel as well as movement axially or away from the wheel. The assembly is not dependent on the inner race to positively maintain the outer race rings in position.

These and other objects, advantages, purposes, and features of the invention will become more apparent from a study of the following description taken in conjunction with the drawings.

BRIEF DESCRIPTION OF THE DRAWINGS

FIG. 1 is a sectional view of the preferred form of the improved trolley wheel assembly of the present invention;

FIG. 2 is an end elevation of the trolley wheel assembly shown in FIG. 1;

FIG. 3 is an exploded perspective view of the trolley wheel assembly shown in FIGS. 1 and 2;

FIG. 4 is a fragmentary, sectional view illustrating the manufacture of the wheel assembly shown in FIG. 1 wherein an annular shoulder is staked over the circumference of the outer race ring with a cylindrical staking tool;

FIG. 5 is a fragmentary, sectional view of an alternative embodiment of the trolley wheel assembly utilizing staked or headed studs to hold the outer race rings in their axial positions;

FIG. 6 is a sectional view of another embodiment of the trolley wheel assembly illustrating a modified multipiece inner race structure;

FIG. 7 is a sectional view of yet another embodiment of the trolley wheel assembly illustrating a third embodiment of a multipiece inner race structure; and FIG. 8 is a sectional view of yet another embodiment of the trolley wheel assembly including a fourth embodiment of the multipiece inner race structure.

DESCRIPTION OF THE PREFERRED EMBODIMENT

Referring now to the drawings in greater detail, FIGS. 1–4 illustrate a preferred embodiment 10 of the improved trolley wheel assembly including a plastic tire or wheel 12 having a central opening 14, a pair of metallic outer bearing races 30 positioned adjacent and on either side of the opening 14, an axially extending inner race assembly 40 extending through opening 14, and a pair of spaced, full complement rows of antifriction, stainless steel ball bearings 60 fitted between the inner race assembly and outer race rings for rotational support of the wheel and outer race rings about the inner race assembly.

With reference to FIG. 1, 3, and 4, trolley wheel or tire 12 is formed from a plastic material and includes an outer circumferential surface which is sloped to one side to accommodate the surfaces of a typical I-beam when mounted on either side thereof in a conventional overhead conveyor system. Alternately, the circumferential surface is formed at a right angle to the axial end surfaces of the wheel to ride upright on a flat surface. Each of the axial end surfaces 16, 18 includes an annular recess 17, 19, respectively, which is matched to the contour of the outer race rings 30. The recesses 17, 19 include radial portions 17a, 19a leading to annular, configured portions 17b, 19b extending between those radial portions and the opening 14 as is best seen in FIGS. 3 and 4. Since axial side 16 is typically immediately adjacent the center web of an I-beam when the wheel is arranged on an overhead conveyor, side or end 16 is recessed inwardly at 20 to form an annular shoulder 21 adjacent the circumference of the recess 17. On the opposite axial side 18, a protruding annular shoulder 22 bulges outwardly adjacent the circumference of the recess 19. Although recesses 17, 19 are generally circular in shape for the majority of their circumferential extent, they do include opposing, rectilinear or flat portions 23, 24 spaced 180° apart which mate with flat or rectilinear edges of the outer race rings in a manner more fully described below. The depth of recesses 17, 19 is substantially greater than the thickness of the metallic material used to form outer race rings 30 so that shoulders 21, 22 protrude beyond the outer race rings in position to be formed thereover.

Each of the outer bearing races 30 includes a stamped, annular ring preferably of stainless steel including an outer, annular, substantially planar, radially extending flange 32 whose circumference is generally circular but which includes opposing flat or rectilinear edge surfaces 33 spaced 180° apart to match the locations of flat or rectilinear portions 23, 24 of shoulders 21, 22 on the wheel or tire 12. Inwardly of the radial flange 32 is an annular ball bearing engaging portion 34 having a contoured, circular shape which matches the surface of the ball bearings received thereby. The convex, contoured surface of the inner side of race rings 30 matches the contoured shape of recessd portions 17b, 19b on the tire 12 while the inside planar surface of flange 32 rests on the shoulder portion 17a, 19a of recesses 17, 19. The outer race rings 30 are spaced apart when fitted to the tire 12 by a central portion 25 (FIG. 4) which precisely spaces the rings in proper relationship for receipt of the full complement rows of ball bearings 60.

As is best seen in FIGS. 1 and 3, the axially extending inner race assembly 40, which is preferably entirely formed from stainless steel, includes a solid shaft 42 including an enlarged outer head portion 44 which curves inwardly in a concave, curved section 46 to a cylindrical shank portion 48. Curved section 46 is complementary to the contour of ball bearings 60 and has the same radius of curvature as the contoured, curved surface of portion 34 of the outer race rings 30 such that the ball bearings will be properly supported therebetween. Cylindrical shank portion 48 extends partially along the length of shaft 42 and terminates in an inwardly directed, radial shoulder 50. A stud portion 52 extends axially from shoulder 50 and is threaded at its outermost end 54.

A second inner race bearing surface is formed by inner race member 55. Member 55 includes a first enlarged outer diameter portion 56 and a curved, concave surface 57 extending to a cylindrical shoulder 58 of a reduced diameter corresponding generally to the outer diameter of shank 48 formed on shaft 42. Member 55 includes an axial opening 59 corresponding generally to the diameter of stud 52 for positioning thereover such that the end 53 will be positioned in abutting relationship to shoulder 50 on shaft 42. Curved surface 57 is complementary to the surface of bearings 60 and has the same radius of curvature as the curved surface of contoured portions 34 of outer race rings 30 and curved section 46 on shaft 42.

Inner race member 55 is retained on shaft 52 by a retainer assembly including a split, resilient retainer clip ring 65 fitted in registering grooves 66, 67 (FIGS. 1 and 3) formed respectively on the outside and inside diameters of shaft 52 and inner race member 55. One of the grooves 66, 67 is slightly wider than the clip 65 such that slight axial movement may be obtained between member 55 and shaft 52 to allow member 55 to be tightened securely against shoulder 50 such tha the inner race members function together as a unit without rotation therebetween. The width of member 55 is sufficient to project beyond the outer surface of shoulder 22 on axial end surface 18 of tire 12 so that a trolley bracket or other abutment surface will engage member 55 and force it tightly against shoulder 50. In addition, at least one of the grooves 66, 67 is sufficiently deep to receive the entirety of the resilient clip 65 when shaft 52 and member 55 are assembled. The structure of this multipiece race assembly is described and claimed in copending, commonly assigned U.S. Pat. application Ser. No. 671,721, filed Mar. 29, 1976, entitled CON- NECTION APPARATUS FOR MULTIPIECE BEARING RACE and invented by Devere W. Schmidt, the disclosure of which is hereby incorporated by reference herein.

Referring now to FIG. 4, identical outer race rings 30 are successively placed in recesses 17, 19 and a cylindrical forming tool 70 is brought into contact with the annular shoulders 21, 22 to stake or form a portion of those shoulder over the outer surface of outer bearing rings 30. Portions 26, 27, which are formed by the beveled edge 72 of the cylindrical staking tool 70, extend out and over the outer surface of rings 30, around substantially the entire circumference of the rings including the flat or rectilinear edges 33. Portions 26, 27 thereby clamp the rings between portions of the wheel or tire 12 and prevent them from moving axially with respect to the wheel or tire while holding rectilinear edges 33 in engagement with rectilinear surfaces 23, 24 on the tire to prevent rotation of the rings with respect to the tire during use.

As shown in FIG. 5, an alternate method for axially affixing rings 30 to a wheel or tire is shown. In this instance, a plurality of generally right, circular, cylindrical studs or projections 80, 82 extend axially outwardly from the radial surfaces 17a', 19a' of a wheel or tire 12' which is otherwise exactly similar to wheel or tire 12 as described above. A circular aperture 36 is formed through the radially extending flange 32 of each of the outer race rings 30 in registry with the position of each of the studs 80, 82 (FIGS. 3 and 5). Recesses and shoulders 17', 19' and 21', 22' and outer bearing rings 30 otherwise include the same rectilinear surfaces or flats 23, 24, and 33, respectively, which prevent rotation of the rings when assembled with the tire 12'. During assembly, rings 30 are placed in recesses 17', 19' such that studs 80, 82 project through the apertures 36 and beyond the outer surfaces of the rings 30. Thereafter, the studs or projections are staked, crimped, or headed over the outer ring surfaces with a heated or ultrasonically vibrated staking tool or merely with a tool which compresses the stud material and utilizes the cold flow characteristics of the plastic material from which tire 12' is formed. Accordingly, rings 30 are tightly held against tire 12' and prevented from axial movement by the headed studs 80, 82.

Preferably, tires 12, 12' are formed from a thermoplastic material such as an acetal resin sold under the trademark "Delrin" by I. E. DuPont de Nemours and Company. This material has been found highly suitable for circumferential staking of the rings 30 to the tires 12 or the heading of studs 80, 82 on tires 12' at either room temperature or at elevated temperatures. It also has high load bearing capabilities without significant cold flow. The material may be permanently deformed or strained as desired using either cold deformation with a punch press or the like by imparting a compressive load to the material such that the load exceeds the yield point of the Delrin. Deformation using heated tools, such as tool 70, is also possible. Although the material may be deformed, strained, or headed at either an elevated or room temperature, deformation at elevated temperatures results in less recovery of original shape when a low heading or deformation force is used. The suggested maximum temperature for deforming the Delrin material is approximately 320° F. (160° C.).

Referring now to FIGS. 6–8, alternative embodiments of the axially extending inner race assembly are illustrated which may be used with the present improved trolley wheel structure. All of the alternate inner race assemblies are preferably formed from stainless steel and utilize split, resilient, retainer clips 65 seated in grooves having dimensional characterisitics allowing assembly with the clip in place on one of the members and slight axial movement of the inner race pieces with respect to one another after assembly in accordance with the structure disclosed in copending, commonly assigned United States patent application Ser. No. 671,721, mentioned above.

In FIG. 6 a substantially constant diameter mounting shaft 85, having an extending, threaded end 86 and an enlarged retaining end 87, is inserted axially through a pair of hollow, cylindrical, axially aligned inner race members 88, 89 which abut one another at end surfaces 90. Head 87 fits in a corresponding recess 91 at one end of member 88 while the outer diameters of members 88, 89 are contoured at 92, 93, respectively, to match the contours of the ball bearing members 60 fitted therebetween and rings 30.

In FIG. 7, the axially extending inner race assembly is similar to that shown in FIG. 6 except that a hollow bushing 95 is substituted for the shaft 85. Bushing 95 includes an enlarged head or shoulder 96 which is received in recess 91 of member 88 while snap ring 65 holds member 89 in abutment with member 88 and against head 96. The inner diameter of bushing 95 may be fitted over a shaft or other support axle to support the entire trolley wheel assembly as desired.

In FIG. 8, the axially extending inner race assembly includes but two generally cylindrical parts 100 and 102. Part 100 generally corresponds to a solid combination of parts 88 and 95 shown in FIG. 7 formed including a shoulder 104 against which member 102 is fitted. Again, the resilient retainer clip 65 holds the parts together while the inner diameter 105 of member 100 allows the entire trolley wheel assembly to be mounted on a shaft or axle as desired.

In each of the trolley wheel assemblies shown in FIGS. 6–8, as well as in the embodiment 10 shown in FIGS. 1–4, inner race members 55, 89, and 102 project beyond the outermost surface of tire 12 and, more specifically, shoulder 22 and/or circumferentially staked portion 27, so that a bracket 11 or other abutment member (FIG. 1) may engage the end surface of these inner race members and force them tightly against their cooperating inner race members as is explained in copending application Ser. No. 671,721. In FIG. 5, the headed studs 80, 82 do not project beyond the side surfaces of the tire 12' so that these headed studs in no sense interfere with the rotational movement of the trolley wheel assembly.

Accordingly, the present invention provides a durable, long-wearing, improved trolley wheel assembly especially useful in high heat, high moisture atmospheres such as the food processing industry where the assemblies must be cleaned at regular intervals. The use of the plastic materials and stainless steel components prevents corrosion and other deterioration such as chipping or flaking of the assembly. Wear is substantially reduced because rotation between the outer bearing race rings is prevented while axial movement of those rings is restrained. Moreover, the assembly may be used with various axially extending inner race assemblies as is described herein.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. An antifriction trolley wheel assembly comprising a plastic wheel having a central opening and an axis therethrough; an annular, metallic, outer bearing race positioned on said wheel adjacent said opening; axial means extending through said opening having an annular, metallic, inner bearing raceway extending about at least a portion of said axial means and spaced from said outer race; a plurality of antifriction means disposed in said space defined between said race and raceway for rotatably supporting said wheel and outer bearing race with respect to said inner raceway; said outer race including an annular, contoured portion matched to the contour of said antifriction means for rotational support thereof and an annular flange extending radially outwardly from said contoured portion and engaging said wheel, said flange having a noncircular circumferential edge engaging a similarly shaped portion of said wheel to prevent rotation of said outer race with respect to said wheel.

2. The trolley wheel of claim 1 including a portion of said plastic wheel formed over the outer surface of said outer bearing race whereby said outer race is retained between portions of said wheel and prevented from moving axially.

3. The trolley wheel assembly of claim 2 including an annular shoulder adjacent the outer periphery of said flange on said outer race, said formed portion of said plastic wheel including at least a portion of said annular shoulder.

4. The trolley wheel of claim 3 wherein said formed portion extends around generally the entire periphery of said flange.

5. The trolley wheel of claim 2 including at least one stud formed integrally and in one piece with said wheel in alignment with an aperture through said flange on said outer race, said formed portion including the outer end of said stud being headed or formed over said outer race.

6. The trolley wheel of claim 5 including a plurality of said studs, each stud extending axially of said wheel through an aperture in said outer race and having its outer end formed over against the outer surface of said outer race.

7. The trolley wheel of claim 1 wherein said flange includes a generally circular circumferential surface, said noncircular edge including a rectilinear portion on said circumferential surface, said similarly shaped portion on said wheel including a rectilinear shoulder extending parallel to and in engagement with said rectilinear edge.

8. The trolley wheel of claim 6 including a plurality of rectilinear segments on said circumferential edge of said flange and a corresponding plurality of matching rectilinear shoulders on said wheel.

9. The trolley wheel of claim 1 including a plurality of annular outer bearing races and a corresponding plurality of rows of antifriction bearing means, each of said outer bearing races including a contoured portion matching the contour of the antifriction bearing means in its respective row and an annular, radially extending flange having a noncircular circumferential edge engaging a similarly shaped portion of said wheel.

10. The trolley wheel of claim 1 wherein said plastic wheel is formed from a thermoplastic material such as acetal resin.

11. An antifriction trolley wheel assembly comprising a plastic wheel having a central opening and an axis therethrough; an annular, metallic, outer bearing race positioned on said wheel adjacent said opening; axial means extending through said opening having an annular, metallic inner bearing raceway extending about at least a portion of said axial means and spaced from said outer race; a plurality of antifriction means disposed in said space defined between said race and raceway for rotatably supporting said wheel and outer bearing race with respect to said inner raceway; said outer race including an annular, contoured portion matched to the contour of said antifriction means for rotational support thereof and a noncircular, circumferential surface engaging a corresponding noncircular surface forming a portion of said wheel and generally parallel to said noncircular, circumferential surface on said outer race whereby rotation between said wheel and outer bearing race is prevented; said plastic wheel including a portion formed over the outer surface of said outer bearing race whereby said outer race is retained between portions of said wheel and prevented from moving axially.

12. The trolley wheel of claim 11 wherein said formed portion of said plastic wheel includes said corresponding, irregular surface on said wheel which has an annular shoulder adjacent the outer periphery of said outer race.

13. The trolley wheel of claim 12 wherein said formed portion extends around generally the entire periphery of said flange.

14. The trolley wheel of claim 11 including at least one stud formed integrally and in one piece with said wheel in alignment with an aperture through a portion of said outer race, said formed portion of said plastic wheel including the outer end of said stud being formed over against the outer surface of said outer race.

15. The trolley wheel of claim 11 wherein said outer race includes an annular flange extending radially outwardly of said contoured portion, said noncircular, circumferential surface on said outer race including at least one rectilinear edge surface on said flange.

16. The trolley wheel of claim 11 wherein said plastic wheel is formed from a thermoplastic material such as acetal resin.

* * * * *

UNITED STATES PATENT AND TRADEMARK OFFICE
CERTIFICATE OF CORRECTION

PATENT NO. : 4,019,789

DATED : April 26, 1977

INVENTOR(S) : Walter M. Rosin, Douglas J. VanDerMeulen and Charles C. Frost

It is certified that error appears in the above-identified patent and that said Letters Patent are hereby corrected as shown below:

Column 1, lines 35 and 36;

"and can be assembly to drop onto the food being processed," should be deleted;

Column 4, line 56;

"tha" should be --that--;

Column 5, line 9;

"shoulder" should be --shoulders--.

Signed and Sealed this twenty-third Day of August 1977

[SEAL]

Attest:

RUTH C. MASON
Attesting Officer

C. MARSHALL DANN
Commissioner of Patents and Trademarks